United States Patent

Wicki et al.

[11] Patent Number: 6,119,205
[45] Date of Patent: Sep. 12, 2000

[54] SPECULATIVE CACHE LINE WRITE BACKS TO AVOID HOTSPOTS

[75] Inventors: Thomas M. Wicki, Palo Alto; Meera Kasinathan, Sunnyvale; Fong Pong, Mountain View; Ricky C. Hetherington, Pleasanton, all of Calif.

[73] Assignee: Sun Microsystems, Inc., Palo Alto, Calif.

[21] Appl. No.: 08/995,779

[22] Filed: Dec. 22, 1997

[51] Int. Cl.[7] .................................................. G06F 12/08
[52] U.S. Cl. .......................... 711/143; 711/136; 711/137; 711/122; 711/129; 711/134; 711/135; 711/144
[58] Field of Search ................................. 711/136, 143, 711/137, 122, 129, 134, 135, 144

[56] References Cited

U.S. PATENT DOCUMENTS

| | | | |
|---|---|---|---|
| 5,155,824 | 10/1992 | Edenfield et al. | 711/143 |
| 5,542,066 | 7/1996 | Mattson et al. | 711/136 |
| 5,581,725 | 12/1996 | Nakayama | 711/122 |
| 5,634,109 | 5/1997 | Chen et al. | 711/143 |
| 5,802,559 | 9/1998 | Bailey | 711/118 |
| 5,829,010 | 10/1998 | Cherabuddi | 711/100 |
| 5,860,110 | 1/1999 | Fukui et al. | 711/141 |
| 5,895,488 | 4/1999 | Loechel | 711/135 |

*Primary Examiner*—Hiep T. Nguyen
*Attorney, Agent, or Firm*—Gunnison, McKay & Hodgson, LLP; Philp McKay

[57] ABSTRACT

A cache system including a data cache memory comprising a plurality of cache lines. A tag store has an entry representing each line in the cache memory where each entry comprises tag information for accessing the data cache. The tag information includes state information indicating whether the represented cache line includes dirty data. A speculative write back unit monitors the state information and is operative to initiate a write back of a cache line having more than a preselected amount of dirty data.

21 Claims, 4 Drawing Sheets

SPECULATIVE CACHE LINE WRITE BACKS TO AVOID HOTSPOTS

BACKGROUND OF THE INVENTION

1. Field of the Invention

The present invention relates, in general, to cache memory, and, more particularly, to a cache memory design using speculative or preemptive write backs of dirty cache lines to main memory to regulate memory bus traffic volume.

2. Relevant Background

The ability of processors to execute instructions has typically outpaced the ability of memory subsystems to supply instructions and data to the processors. As used herein the terms "microprocessor" and "processor" include complete instruction set computers (CISC), reduced instruction set computers (RISC) and hybrids. Most processors use a cache memory system to speed memory access. Cache memory comprises one or more levels of dedicated high-speed memory holding recently accessed data, designed to speed up subsequent access to the same data. Cache sizes of high-performance processors are continuously growing.

Cache technology is based on a premise that programs frequently reuse the same instructions and data. When data is read from main system memory, a copy is also saved in the cache memory, along with its tag. The cache then monitors subsequent requests for data to see if the information needed has already been stored in the cache. If the data had indeed been stored in the cache, the data is delivered with low latency to the processor while the attempt to fetch the information from main memory is aborted (or not started). If, on the other hand, the data had not been previously stored in cache then it is fetched from main memory and also saved in cache for future access.

In superscalar processors multiple instructions are executed each clock cycle possibly leading to multiple requests for data stored in main memory each clock cycle. This is particularly true during events such as context switching where a new process or thread is started and a previously executing process is stalled, slowed, or aborted. In these cases, the cache(s) will be filled with data and instructions associated with the waning process that need to be replaced by data and instructions associated with the newly started process. Each time a cache line is replaced (i.e., overwritten or evicted), however, if it is dirty (i.e., differs from the corresponding data line in main memory) it must be written back to main memory before it is replaced. In these cases processor performance is very dependent on the speed with which the instructions and data from the waning process can be evicted from cache.

Often times, as in the case of a context switch described above, peak write back traffic occurs simultaneously with peak read traffic. In these cases, the memory bandwidth is preferably allocated preferentially to read traffic to ensure that instruction execution does not stall. To expedite eviction of cache lines, write buffers are used to temporarily hold the evicted data until it can be written back. Unfortunately, the write buffers are either sized to handle peak loads, in which case they are space inefficient, or they are smaller than peak load capacity, in which case processor performance is compromised. A write buffer can cause a processor stall when it is full, when it contends with a cache miss for access to the next level of cache or memory hierarchy, and when it contains the freshest copy of data needed by a load operation. Hence, it is desirable to regulate memory bandwidth required by write operations that limits the use of write buffers.

Write policy refers to whether dirty cache lines are written back to main memory as soon as they are changed (i.e., write through) or at a time determined by the replacement algorithm (i.e., write back or lazy write back). A write through policy ensures that data altered by the executing program is copied to main memory and non-volatile storage as soon as possible to maximize data integrity. A pure write through policy, however, commits significant memory bandwidth to writing data out of cache and negatively impacts system performance. A lazy write back policy waits to initiate a write back until system resources require a write back (e.g. upon filling all possible cache lines in a cache level) and so increases system performance at the expense of increasing burstiness of the write back traffic. Write back policy is established to meet the needs of a particular application.

Memory management techniques typically use a precise or pseudo least recently used (LRU) algorithm to select cache lines for replacement. The LRU technique monitors addresses of cache lines that are accessed and selects lines for replacement based upon frequency of accesses or how recently a cache line was accessed. LRU techniques typically initiate replacement and the associated write backs on demand when all possible cache lines of one cache level are completely filled or filled (i.e., all n ways of an n-way set associative cache, for example). Once all possible cache lines are full replacement of a cache line is necessary before new data can be transferred into the cache. Waiting for a cache to fill before initiating a write back exasperates the peak load problem by waiting until it is critical to write back information. In the case of a context switch, for example, much of the cache data may be dirty and require write back before new data can be loaded.

There is a trend to use larger cache lines (i.e., cache lines that each hold more data) to take advantage of spatial locality in data storage. Larger cache lines require a smaller tag storage area because each address tag has less information or increased granularity. However, larger cache lines may result in loading data into cache that is not used as an entire cache line is filled even for a small memory request. Likewise, an entire cache line can be replaced (and require write back) to load in only a small amount of new data. Hence, increasing granularity results in frequent high volume write backs.

Using a technique called sub-blocking, larger cache levels have a higher granularity than smaller cache levels. The higher sub-blocked cache levels have fewer tag entries as each entry represents a larger number of data bytes in the sub-blocked cache as compared to the lower level cache(s). For example, each line in the sub-blocked cache may hold two, four, or more lines of data from the lower cache level(s). Each lower-level cache line is referred to as a block within the higher level cache line. The tag information in the sub-blocked cache is augmented with more valid bits where each valid bit indicates whether a specific block is valid. Hence, sub-blocking is a compromise that improves cache efficiency of the lower cache levels while reducing the tag size and data transfer requirements of higher cache levels. Sub-blocking increases complexity of cache management, however, and in particular makes replacement more difficult. For example, evicting a single cache line in a low level cache might result in evicting (and writing back) multiple lines in the higher level cache. In a typical example, replacement of a 64 byte level one cache line may result in write back of 512 bytes of data (i.e., the equivalent of eight cache lines) to main memory from a higher level cache. For collision conflicts, sub-blocking increases the frequency of write backs and greatly taxes memory bandwidth. Both increasing cache line size and sub-blocking take advantage of spatial locality to reduce the size of the tag storage area, but a need exists for a cache system and method for operating a cache that takes advantage of spatial locality while regulating peak memory traffic during write backs.

SUMMARY OF THE INVENTION

The present invention involves a cache memory system that combines pseudo least recently used replacement algorithm with a speculative write back that is initiated based upon the amount of dirty data in the cache line and how recently the data was used, and whether all possible cache lines in a cache level are full, but without regard to frequency of use. As cache accesses are processed, a speculative write back unit monitors the number of valid entries (or invalid entries) in tag store corresponding to each cache line. The monitoring occurs, for example, by reading cache tag information from the tag store as a cache line is accessed. Alternatively, the unit requesting access to cache can send out a signal activating the monitor unit. Alternatively, the speculative write back unit can initiate an inquiry of the cache tag store independently to track the count of valid sub-blocks in a cache line. When the number or percentage of dirty sub-blocks in a cache line is above a preselected threshold and a sub-block or cache line was not recently accessed the sub-blocker or the entire cache line is chosen to be speculatively written back. After a speculative write back the clean cache line remains in the cache for future accesses and the dirty bits are reset. Upon eviction, the cache line or sub-blocks thereof only needs to be written back again if one or more of the sub-blocks has been altered subsequent to the speculative write back.

The system and method in accordance with the present invention is particularly useful when applied to higher cache levels that use sub-blocking to reduce the tag store size. By speculatively writing back the large cache line at a higher cache level at a convenient time, the likelihood of a write back initiated by a replacement algorithm at an inconvenient time is reduced.

In another aspect, the present invention involves a method for operation of a cache memory using speculative write backs. Cache system accesses are generated where each access comprises an address identifying a memory location having data that is a target of the access. The address is applied to a tag store that holds address tag information corresponding to one or more cache lines in the associated cache. The tag store includes a valid marker for each sub-block of data in the associated cache line. The dirty bit indicates whether the sub-block of data is dirty. The tag information is monitored and in response to identifying tag information indicating more than a preselected amount of dirty sub-blocks, the associated cache lines are marked for speculative write back. Desirably, speculative write backs are executed during low traffic times on the memory bus. Optionally, the speculative write backs are buffered in which case it is desirable to remove speculative write backs from the buffer when a subsequent data access alters the cache line before the write back is completed. In response to completion of the speculative write back, the tag information is modified to indicate that the written back sub-blocks of the associated cache line are clean and the data is retained in the cache line.

DETAILED DESCRIPTION

The present invention involves a method and apparatus for operating a processor using a data cache that is particularly useful when sub-blocked data cache architecture is used. As used herein the term "data" includes date that represents instructions. It should be understood that the present invention is useful in conventional non-sub-blocked architectures also. In general, the present invention provides a system and method for writing back data preemptively or speculatively to reduce write back traffic when the replacement algorithm needs to evict cache lines for new data. In this manner, latency associated with write back traffic is reduced without the need for impracticably sized write back buffers. In a particular example sub-blocking is used for an off-chip cache to provide smaller physical size of the cache tag store so that the cache tag store can be implemented on-chip.

Figure 1:
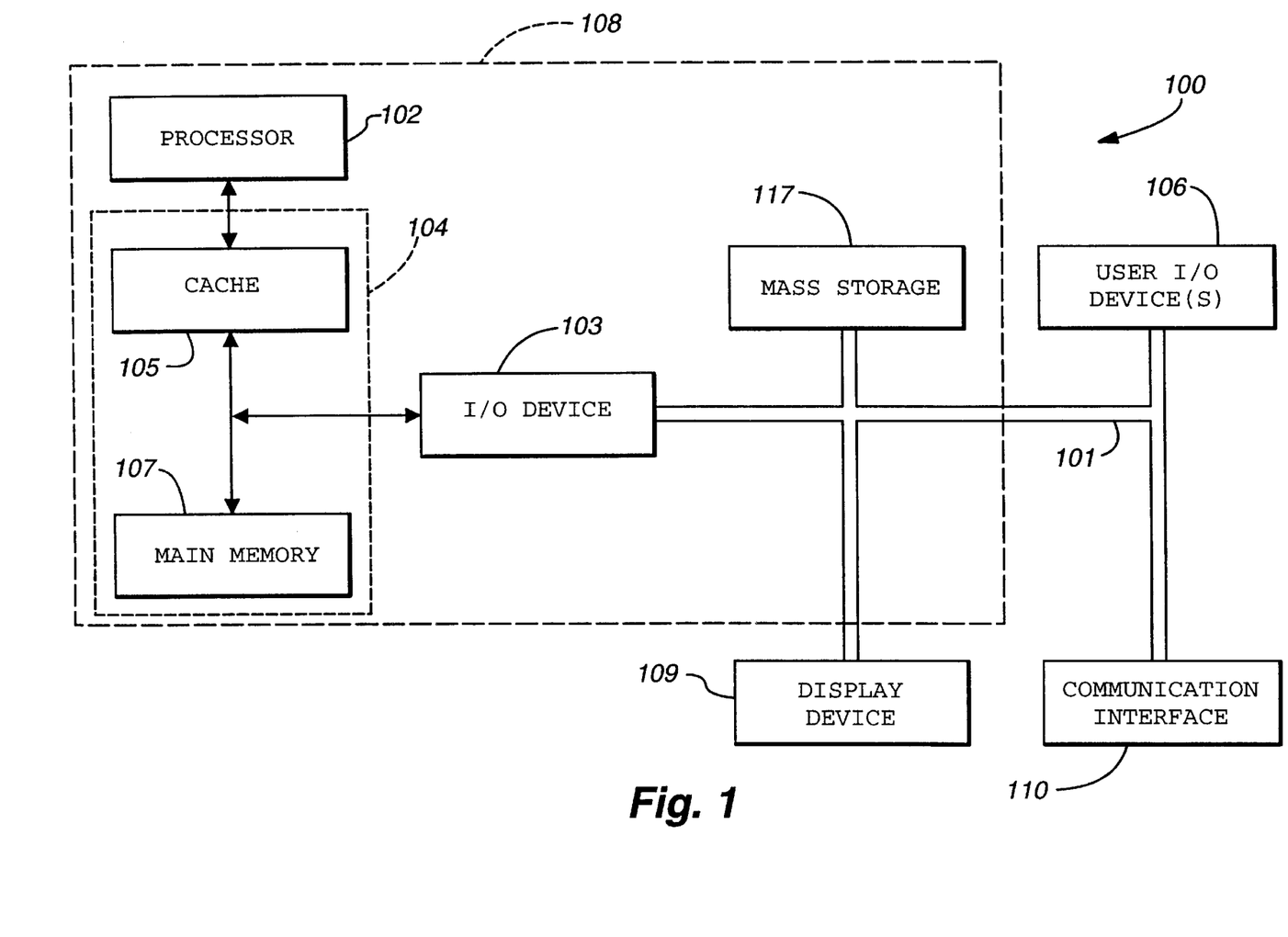
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
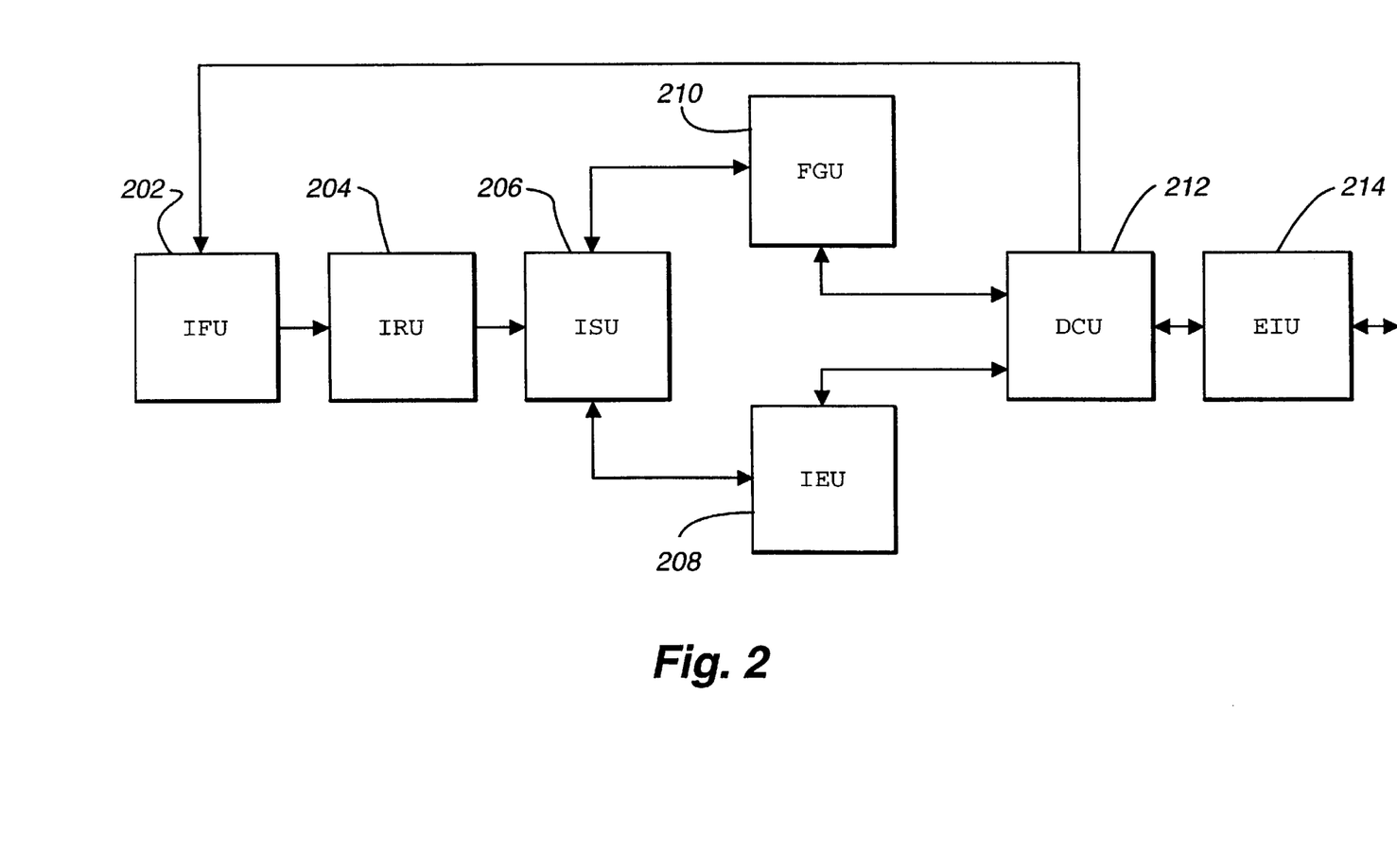
FIG. 2 shows a processor in block diagram form incorporating the apparatus and method in accordance with the present invention.

The present invention is described in terms of apparatus and method particularly useful in a superpipelined and superscalar processor 102 shown in block diagram form in FIG. 1 and FIG. 2. The particular examples represent implementations useful in high clock frequency operation and processors that issue and execute multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory, whereas one or more levels of which might be implemented on a separate integrated circuit from processor 102. In a typical embodiment, processor 102, I/O device 103, and some of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input/output devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD), a printer or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature is often used to identify equivalent functional units.

Instruction fetch unit (IFU) 202 comprises instruction fetch mechanisms and includes, among other things, an instruction cache (I$ 301 in FIG. 3), which is also a part of cache subsystem 212, for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing instruction cache 301. Typically IFU 202 generates logical or virtual addresses to a translation lookaside buffer 311 (shown in FIG. 3) which in turn generates physical addresses used by cache unit 212. The instruction cache 301 feeds addressed instructions to instruction rename unit (IRU) 204.

In the absence of branch instructions, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the next instruction in the predicted branch is applied to instruction cache 301 rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent certain types of dependencies. IRU 204 further comprises dependency checking mechanisms that analyze the instructions to determine if the operands (identified by the instructions' register specifiers) are available. The term "live instruction" as used herein refers to any instruction that has been fetched but has not yet been retired. IRU 204 outputs renamed instructions to instruction scheduling unit (ISU) 206.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur.

ISU 206 also operates to retire executed instructions when completed by IEU 208 and FGU 210. ISU 206 performs the appropriate updates to architectural register files and condition code registers upon complete execution of an instruction. An instruction is retired when it has finished execution and all prior instructions have completed. Upon retirement the instruction's result is written into the appropriate register file.

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. In the particular implementation described herein, IEU 208 executes all integer instructions including determining correct virtual addresses for load/store instructions. IEU 208 also maintains correct architectural register state for a plurality of integer registers in processor 102.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units. In the specific example, FGU 210 also includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used.

A cache unit (DCU) 212, including cache memory 105 shown in FIG. 1, functions to cache memory reads from off-chip memory 107 through external interface unit (EIU) 214. DCU 212 also caches memory write transactions. DCU 212 comprises one or more hierarchical levels of cache memory 105 and the associated logic to control the cache memory 105. One or more of the cache levels within DCU 212 may be read-only memory (from the processor's point of view) to eliminate the logic associated with cache writes.

Figure 3:
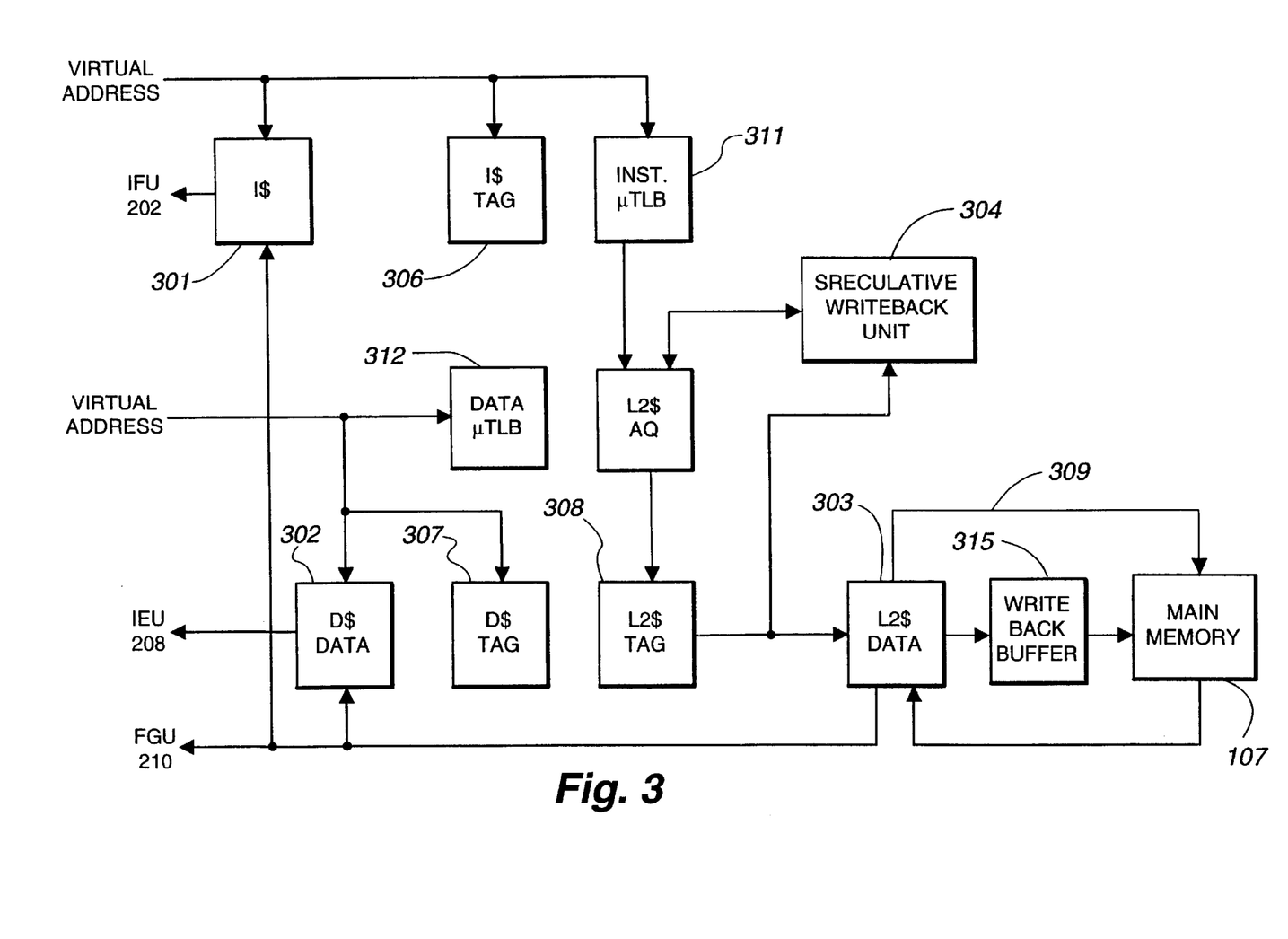
FIG. 3 illustrates in block diagram form a high level overview of a cache subsystem in accordance with the present invention.

DCU 212 in accordance with the present invention is illustrated in greater detail in FIG. 3. DCU 212, alternatively referred to as the data cache subsystem, comprises separate instruction cache 301 and data cache 302 (labeled I$ and D$ in FIG. 3) in a typical implementation, although, a unified instruction/data cache is an equivalent substitute in some applications. Using separate caches 301 and 302 to store recently used instructions and recently accessed data increases efficiency in many applications. The first level caches I$ 301 and D$ 302 are virtually indexed and physically tagged in a specific embodiment. These caches have each line indexed by virtual address, however the tag information is from the physical address determined after the virtual address is translated. I$ 301 and D$ 302 may be implemented as direct mapped, n-way set associative, or fully associative to meet the needs of a particular application. Accordingly, these other implementations are equivalent to the specific embodiments described herein for purposes of the present invention.

A unified sub-blocking level 2 cache 303 (labeled L2$ DATA) is also used. Associated with each cache 301–303 is a tag memory 306–308 respectively that stores address tag information relating to the data stored in the associated cache. A tag memory is also called a "tag store" or "tag array". The addresses stored in the tag arrays 306–308 are the physical addresses from main memory 107 that have data corresponding to the data or instructions held in the cache 301–303 associated with the tag array 306–308.

IFU 202 generates virtual addresses coupled to instruction cache 301 (when instruction cache 301 is virtually indexed) and to instruction micro-translation lookaside buffer (μTLB) 311 to enable instruction fetching from physically-addressed cache levels and main memory. In a particular example, IEU 208 includes one or more memory pipes generating virtual addresses to virtually indexed data cache 302 and to micro-translation lookaside buffer (μTLBs) 312 for integer and floating point load and store operations. Virtual to physical address translation occurs in a conventional manner through micro translation lookaside buffers (μTLBs) 311 and 312 that are hardware controlled subsets of a main translation lookaside buffer (TLB) (not shown). TLBs store the most-recently used virtual:physical address pairs to speed up memory access by reducing the time required to translate virtual addresses to physical addresses needed to address memory and cache. TLB misses are handled using any available technique, including hardware and software handling, to generate the virtual:physical pair when the pair does not exist in the TLB. Address translation is not required for virtually indexed cache or memory and so TLBs are incorporated only as needed.

The memory access requests from each functional unit are coupled through L2$ access queue 310 to the L2$ tag store 308. L2$ access queue handles arbitration among competing access requests and may buffer one or more access requests. Although illustrated as a single port design, it should be understood that L2$ tag 308 may include multiple address ports and so address queue would be configured to supply access requests to each of the available ports simultaneously.

When a request is made for instructions at a particular address, a tag inquiry is performed by comparing the physical address from TLB 311 with the addresses in tag array 306. The physical address is also coupled, desirably in parallel, to L2$ tag array 308 through L2$ access queue. In this manner, tag inquiries are conducted in parallel to expedite results from all tag memories. Similarly, when a request is made for data at a particular address, a tag inquiry is performed by comparing the physical address from TLB 312 with the addresses in D$ tag array 307.

Each cache line is represented by an entry in the tag store that includes bits of information that maintain the state of each represented cache line, or in the case of a sub-blocking cache, the state of each sub-block in the represented cache line. The cache line state may be as simple as valid/invalid requiring only one bit per sub-block, or may implement a four-state MOSI (Modified, Owned, Shared Clean, Invalid) protocol, or any other available protocol. What is important in the operation of the present invention is that the state information indicates whether the cache line represented by the tag is dirty and so must be written back.

If the address matches a valid address in the tag array (i.e., a cache hit), the information is accessed in the cache memory; if not, then the main memory is accessed for the information that is then substituted into the cache memory for use by the data processing unit. In the case that the missing cache does not have a line allocated for the requested memory location, one is allocated. If all possible cache lines are full (i.e., all lines occupied with valid data) a replacement mechanism selects one of the lines to be evicted and allocated for the requested memory location. As the data is returned from higher cache levels or main memory, it is stored in the allocated line for future use. The functions of maintaining the status information, allocating cache lines, and evicting cache lines for replacement are handled by a cache controller unit 401 (shown in FIG. 4)

When processor 102 attempts to write data to a cacheable area of memory, it first checks if a cache line for that memory location exists in one or more of caches 301–303. Typically, I$ 301 will not permit cache writes unless the processor supports self modifying code, however, the present invention will be illustrated by the general application in which I$ 301 supports writes. If a valid cache line does exist, processor 102 (depending on the write policy currently in force) can write the data into the cache 301–303 instead of (or in addition to) writing it out to main memory 107. This operation is called a "write hit". If a write misses the cache (i.e., a valid cache line is not present in the appropriate cache 301–303 for area of memory being written to), processor 102 performs a cache line fill by allocating a line for the requested data for a write allocate cache policy and by copying the data from a higher cache level or main memory into that line. Cache system 105 then writes the data from internal registers into the allocated cache line and (depending on the write policy currently in force) can also write the data to main memory 107. In a particular example, I$ 301, D$ 302, and L2$ 303 are implemented as non-blocking caches.

In the particular example, instruction TLB 311 and data TLB 312 generate 45 bit physical addresses capable of physically addressing 32 TeraByte of memory. This physical address bit width is provided to illustrate the size and capacity impact on each of I$ tag 306, D$ tag 307, and L2$ tag 308 and not as a limitation upon the present invention. Main memory 107 can be implemented in any available RAM component such as DRAM, FPM DRAM, EDO DRAM, RAMBUS, SDRAM, or SDRAM2 which like the DDR SRAM discussed above provides a clock along with data allowing it to provide high bandwidth performance.

Memory write backs are generated by the replacement mechanism and as a result of execution instructions that flush the cache. In accordance with the present invention, write backs are also initiated by speculative write back unit 304 shown in FIG. 3 and FIG. 4. A write back operation accesses a selected cache line in L2$ 303 by appropriately indexing L2$ tag 308. The accessed line and address are then supplied to main memory 107 where they are stored.

Alternatively, write backs can be performed without a buffer using a direct memory access bus 309, however, predictable performance impact will result.

Figure 4:
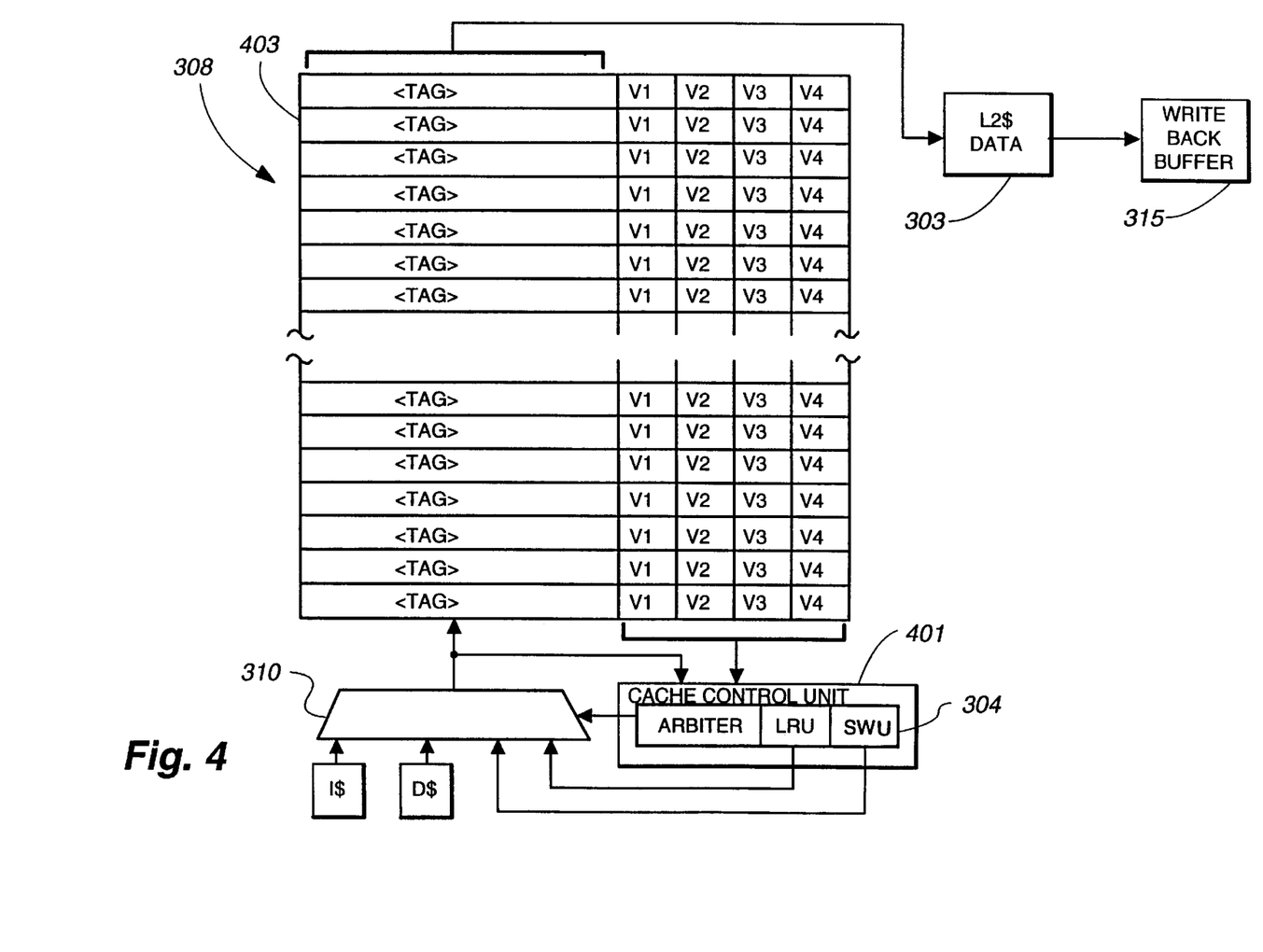
FIG. 4 shows the cache subsystem of FIG. 3 in greater detail including a speculative write back device in accordance with the present invention.

As shown in FIG. 4, L2$ access queue 310 receives access requests from multiple sources including instruction load/ store accesses from I$, data load/store accesses from D$, and multiple accesses initiated by cache controller unit CCU 401. CCU 401 also includes mechanisms (not shown) to take control of L2$ during line fill operations and the like. CCU 401 includes an arbiter for selecting among the competing access requests based upon a preselected priority. CCU 401 receives the address information from the access requests provided by L2$ access queue 310. CCU 401 is also responsible for maintaining the state bits V1, V2, V3, and V4 included in each tag entry 403. V1, V2, V3, and V4 represent one or more state bits necessary to maintain the state of a sub-block of data referred to by a given tag entry.

Read transactions are desirably given a higher priority to avoid stalling execution of instructions that need the requested data. However, typical write back operations initiated by a least recently used (LRU) mechanism in CCU 401 require high priority so that a line can be allocated for new data. The LRU mechanism is sensitive to the address information in L2$ tag store 308 to identify cache lines that are infrequently accessed or that have not been accessed for a long time relative to other entries in L2$ tag store 308. So long as L2$ 303 includes unfilled or invalid lines (i.e., all state bits indicated that every sub-block is invalid), no replacement is necessary and the LRU mechanism is not needed.

In contrast, speculative write back unit 304 is sensitive to the state information of accessed tag entries. Desirably, SWU 304 actively examines the state information even while L2$ 303 contains many invalid lines. SWU 304 selects cache lines that include more than a preselected number or percentage of dirty sub-blocks. The cache lines can be selected, for example, by recording the current address information in response to determining that more than a preselected number of sub-blocks are dirty. In a particular example, each entry 403 includes state information for four sub-blocks, and the speculative write back is initiated when two of the four sub-blocks are indicated as dirty. The selected cache lines are speculatively written back by an SWU-initiated write back applied to L2$ access queue 310.

One advantage of the present invention is that speculative write backs can be given very low priority by the arbiter mechanism in CCU 401 so that they do not interfere with more mission critical memory accesses. LRU-initiated write backs will still occur, however, replacement will often occur after a speculative write back and before the cache line has been modified, in which case replacement can be completed without another write back.

The threshold value at which a speculative write back is initiated may be static or dynamic. In other words, in certain circumstances it may be desirable to speculatively write back data whenever a single sub-block is dirty. In such an application the present invention will resemble a slow cache flush rather than a speculative replacement mechanism. In other circumstances, for example when one or more cache line is being referenced frequently, the speculate write back threshold can be raised until almost all of the state bits indicate dirty sub-blocks. After a speculative write back is completed, CCU 401 alters the state bits V1–V4 to indicate that each sub-block is clean. In contrast to an LRU-initiated write back, the clean data remains available in the cache for future reference.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. These and other modifications and extensions of the present invention are within the scope and spirit of the invention, as hereinafter claimed.

We claim:

1. A cache system comprising:
    a data cache memory comprising a plurality of cache lines;
    a tag store having an entry representing each line in the cache memory wherein each entry comprises tag information for accessing the data cache, the tag information including state information indicating whether the represented cache line includes dirty data; and
    a speculative write back unit monitoring the state information and operative to initiate a write back of a cache line having more than a preselected amount of dirty data while maintaining the data in the cache line and updating the state information to indicate the represented cache line has non-dirty data.

2. The cache system of claim 1 further comprising a least recently used replacement mechanism initiating write back of selected cache lines wherein the selection is based upon time of last access.

3. The cache system of claim 1 wherein the speculative write back unit is operative to initiate a write back of a selected cache line without regard to frequency with which the selected cache line is accessed.

4. The cache system of claim 1 wherein the speculative write back unit is operative to initiate a write back of a selected cache line without regard to how recently the cache line was accessed.

5. The cache system of claim 1 wherein the data cache memory is sub-blocked and each cache line comprises a plurality of sub-blocks, each sub-block being represented by independent state data in the associated tag entry.

6. The cache system of claim 5 wherein the speculative write back unit monitors the state information for each of the sub-blocks in a cache line and is operative to initiate a speculative write back of a cache line when more than a preselected number of sub-blocks in a cache line include dirty data.

7. The cache system of claim 1 wherein the preselected amount of dirty data is selected to be a fixed percentage of dirty data in the cache line.

8. The cache system of claim 1 wherein the preselected amount of dirty data is dynamically set based upon the time of last accesses to each cache line.

9. The cache system of claim 1 wherein speculative write back unit is coupled to the tag store to receive the state information and address information held in the tag store each time a tag store entry is accessed.

10. The cache system of claim 1 wherein speculative write back unit is coupled to the tag store to initiate snoops of selected tag store entries to monitor the state information of the selected tag store entries.

11. The cache system of claim 1 wherein data cache memory is implemented on a separate integrated circuit from the tag store.

12. A computer system comprising:
    a processor formed as an integrated circuit chip;
    a cache system coupled to the processor, the cache system further comprising:

an on-chip cache comprising a plurality of cache lines;
a first on-chip tag store holding tag information for accessing the on-chip cache;
an off-chip sub-blocked data cache comprising a plurality of cache lines wherein each cache line in the off-chip data cache corresponds to a plurality of lines in the on-chip cache;
a second on-chip tag array holding tag information for accessing the off-chip data cache;
a replacement mechanism monitoring the tag information in the second on-chip tag array to initiate write back of selected LRU cache lines on a least recently used basis; and
a speculative write back unit monitoring the tag information in the second on-chip tag array to initiate speculative write back of selected cache lines based upon the quantity of dirty data in the selected cache lines while maintaining the data in the cache line and updating the tag information to indicate the selected cache line has non-dirty data.

13. The cache system of claim 13 wherein the speculative write back unit is operative to initiate a write back of a selected cache line independent of frequency with which the selected cache line is accessed.

14. The cache system of claim 12 wherein the speculative write back unit is operative to initiate a write back of a selected cache line independent of how recently the cache line was accessed.

15. The cache system of claim 12 wherein the tag information includes state information for the represented cache line and the speculative write back unit monitors the state information for each of a plurality of sub-blocks in each cache line and is operative to initiate a speculative write back of a cache line when more than a preselected number of sub-blocks in a cache line include dirty data.

16. The cache system of claim 15 wherein the preselected amount of dirty data is selected to be a fixed percentage of dirty data in the cache line.

17. The cache system of claim 15 wherein the preselected amount of dirty data is dynamically set based upon the time of last accesses to each cache line.

18. In a processor that executes coded instructions, a method for operation of a cache memory having a cache tag array comprising a plurality of entries wherein each entry stores tag information representing a line of data in the cache memory, the method comprising the steps of:
provided state information in the tag information indicating state of the represented cache line;
generating cache system access requests, each access request comprising an address identifying a memory location having data that is a target of the access;
performing a cache tag lookup by applying the address in an access to the cache tag array;
in response to the cache tag lookup, monitoring the state information of the cache tag entry corresponding to the access request to detect dirty data included in the represented cache line; and
initiating, in response to the monitoring step, a write back of the represented cache lines including more than a preselected amount of dirty data while maintaining the data in the represented cache lines and updating the state information to indicate the represented cache lines have non-dirty data.

19. The method of claim 18 wherein the step of generating cache system access requests further comprises initiating an inquiry of the cache tag array wherein the purpose of the inquiry is exclusively to monitor the state information.

20. The method of claim 18 wherein the initiated write back is given a low execution priority with respect to incoming cache system access requests.

21. The method of claim 20 further comprising the steps of:
using a least recently used mechanism independently of the initiated write back to select an entry in the cache to be written back.

* * * * *

UNITED STATES PATENT AND TRADEMARK OFFICE
CERTIFICATE OF CORRECTION

PATENT NO. : 6,119,205
DATED : September 12, 2000
INVENTOR(S) : Thomas M. Wicki, Meera Kasinathan, Fong Pong and Ricky C. Hetherington It is certified that error appears in the above-identified patent and that said Letters Patent is hereby corrected as shown below:

Column 10,
Line 53, before "speculative" insert -- the --.
Line 57, before "speculative" insert -- the --.
Line 61, before "data" insert -- the --.

Column 11,
Line 21, delete "claim 13" and substitute -- claim 12 --.

Signed and Sealed this

Thirtieth Day of April, 2002

Attest:

JAMES E. ROGAN
*Attesting Officer* — *Director of the United States Patent and Trademark Office*